June 8, 1965     A. M. FERRARI     3,187,788
BAND SAW

Filed Dec. 1, 1961     3 Sheets-Sheet 1

Arthur M. Ferrari
INVENTOR.

June 8, 1965  A. M. FERRARI  3,187,788
BAND SAW
Filed Dec. 1, 1961  3 Sheets-Sheet 2
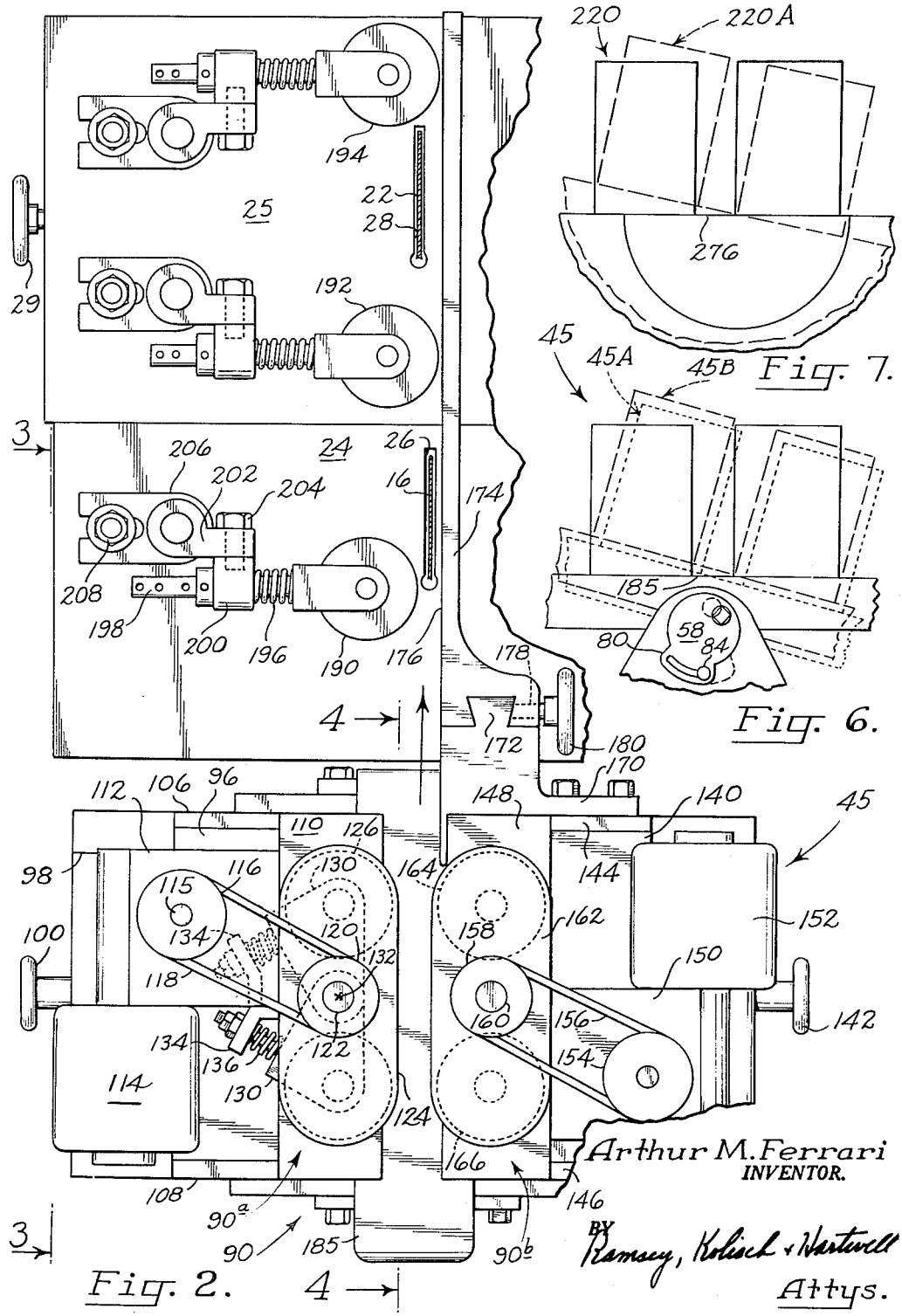
Arthur M. Ferrari
INVENTOR.
BY Ramsey, Kolisch & Hartwell
Attys.

Arthur M. Ferrari
INVENTOR.

BY Ramsey, Kolisch & Hartwell
Attys.

United States Patent Office 3,187,788
Patented June 8, 1965

3,187,788
BAND SAW
Arthur Marion Ferrari, P.O. Box 315, Corning, Calif.
Filed Dec. 1, 1961, Ser. No. 156,458
12 Claims. (Cl. 143—5)

This invention relates to improvements in saw apparatus, and more particularly to improvements in band saw machines or band mills, and the manner in which work is fed to band saw blades therein and steadied during the cutting thereof.

In a machine such as a band saw resaw, it is a common practice to cut a board along its length with one or more diagonal cuts, thus to form molding strips, for instance, or similar items. In such an operation, the band saw blade or blades in the machine remain in the same position that they ordinarily have, i.e., with a reach of the blade or blades extending vertically through a work bed, and the diagonal cut or cuts are produced by inclining a feed mechanism that feeds and guides the lumber into the machine. With such feed mechanism inclined, the lumber introduced has a tilted position with respect to the saw blade or blades, and diagonal cuts result. In a more specific sense, this invention concerns improvements in such mechanism for feeding and guiding lumber into a band mill. The mechanism is easily adjusted to change the angle at which lumber enters the machine, and in various adjusted positions clearance difficulties that have characterized former constructions are eliminated.

Thus, in prior known constructions, when the means for feeding and guiding lumber into the band mill has been inclined to produce a diagonal cut, misalignment has resulted, for instance, between the work bed of the band mill and parts in the mechanism inclined, with such misalignment hindering smooth travel of lumber forwardly into the band mill and detracting from the firm support that for optimum cuts should be provided the lumber. A general object of this invention is to provide a band mill with mechanism for feeding lumber thereinto, where such misalignment may be eliminated.

Another general object of the invention is to provide improvements in band mills, whereby lumber is fed by means constructed to hold the lumber firmly in advance of the saw blade or blades, with at least one side of the lumber, more particularly the gravity side when the lumber is inclined for diagonal cutting, supported on means defining a stationary plane. In the construction, straighter cuts are produced, without "snaking" as the result of slight variations in lumber thickness.

A still further object is to provide an improved band mill that includes means for guiding and supporting lumber fed thereto, where such means is mounted some distance in front of (the feed side) any band saw blade in the band mill. The guiding means for the lumber is in a position where it may be tilted properly (to produce a diagonal cut) without such movement encumbered by the frame of the band mill. It also provides support for lumber at a location spaced a considerable distance from where the cutting occurs, with any whipping in the trailing end of lumber thus being prevented from disrupting evenness of cut.

This invention contemplates the provision of opposed work-contacting guide structures, more specifically, opposed feed rollers or rolls, and a feed bed, mounted on an adjustable frame with the frame spaced toward the feed side of the band mill frame from the band saw blade. Mounting the adjustable frame is means accommodating tilting of the feed bed and the feed rollers thereon, as a unit, in a direction to shift the tops of the rollers inwardly toward the axes of the usual wheels mounting the band saw blade. Since the adjustable frame is mounted in front of the band mill frame, such tilting is accommodated without encumberance by the band mill frame. The feed rollers on the gravity side of the assembly with the same tilted as indicated, are nonyieldably mounted, whereby they provide a stationary support plane for lumber fed the band mill. The feed rollers opposite, or on the outer side, are yieldably biased toward the first set of feed rollers, to produce firm clamping contact with lumber being fed. As a result, when cutting diagonally, the gravity or downhill side of the lumber occupies a stationary plane relative to the saw blade, and a straight cut is produced.

Another object of the invention is to provide such a construction wherein a fence is included that extends from the feed rollers forwardly and on the inner side of the band saw blade beyond the band saw blade. The fence moves as a unit with the feed rollers on adjustment of the position of the feed rollers and provides support for lumber directly adjacent the saw blade.

A related object is to provide such a construction where the fence is adjustable up and down and in a direction generally paralleling its support plane. This assures adequate support for both wide and narrow pieces. Further, the adjustment enables greater range in the angular positioning of the feed rollers.

Yet another object is to provide in a band mill, feeding and guide structure (more specifically feed rollers and a feed bed of the type hereinabove generally indicated) wherein means is provided for shifting the rollers vertically and laterally in addition to tilting them. This adjustment is desirable, as it enables the entire base of the guide structure to be positionable above the work bed of the band mill in all of the positions of the guide structure.

According to one embodiment of the invention, and as an object of the invention, it is contemplated that there be provided pivot means mounting the feed bed and feed rollers of the feeding and guide structure, with such pivot means accommodating pivotal movement about an axis paralleling the path of lumber into the band mill. A mounting for the pivot means is also provided, including eccentric members, constructed so that on turning of the eccentric members the pivot axis may be shifted both upwardly and in a lateral direction. Such adjustment operates to eliminate misalignment that otherwise would result on tilting of the feed rollers and feed bed.

In another embodiment of the invention, and as an object of the invention, it is contemplated that pivot means be provided for the feeding and guide structure, having a pivot axis that parallels the path of work, and that also coincides with the line produced by the intersection of the support plane of the feed bed with the support plane of the feed rollers on the gravity side of the assembly with the same tilted (the inner set of feed rollers as indicated above).

Various other objects and advantages of the invention will become apparent as the following description is read in conjunction with the accompanying drawings, wherein:

FIG. 2 is a plan view, on a somewhat enlarged scale and taken generally along the line 2—2 in FIG. 1. of the work bed in the apparatus of the mechanism provided for feeding and guiding lumber through the machine;

FIGS. 6 and 7 are drawings illustrating somewhat diagrammatically the operation of the apparatus contemplated.

Figure 1:
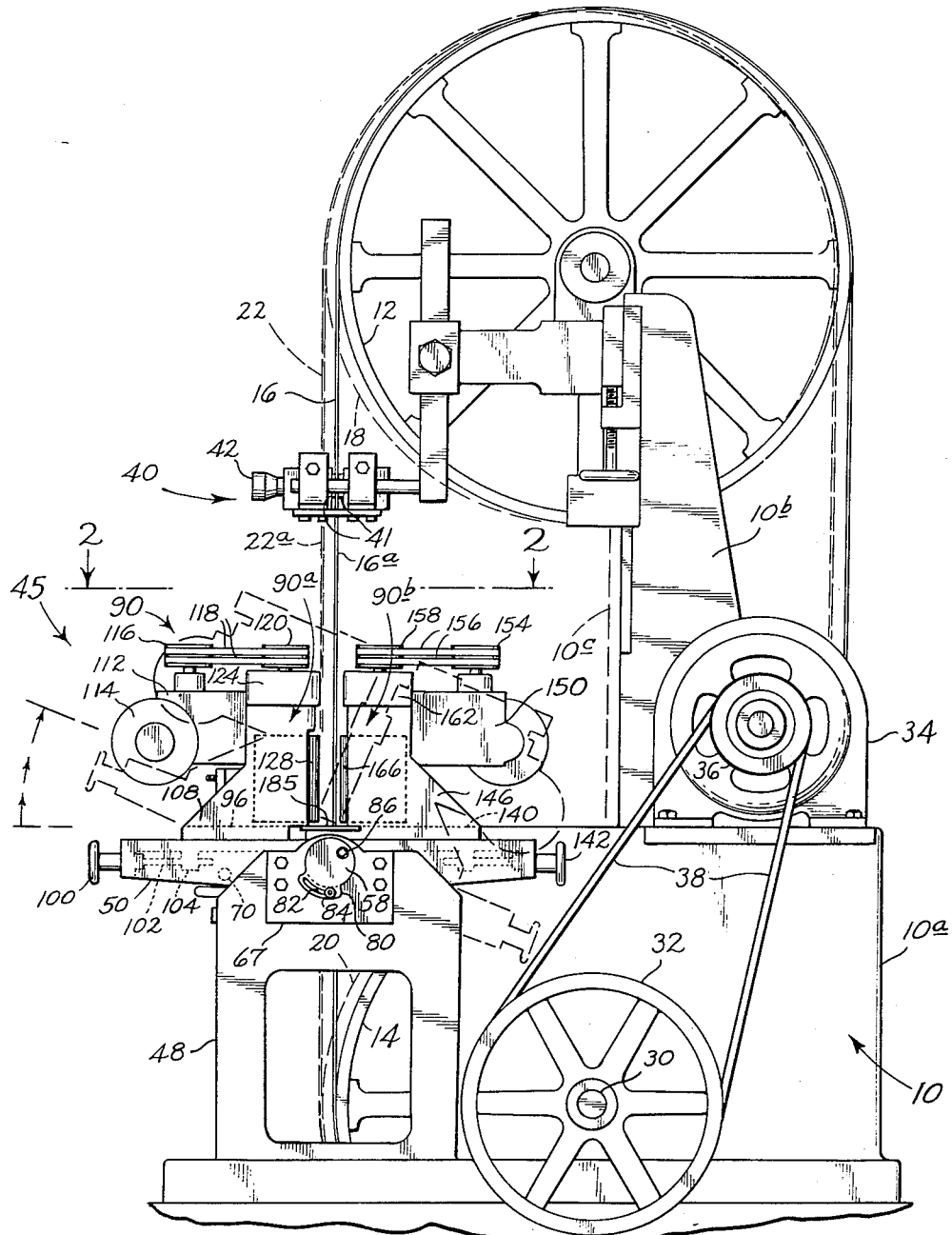
FIG. 1 is a side elevation of a band saw machine, constructed according to one embodiment of the invention.

Referring now to the drawings, and first of all primarily to FIG. 1, a band mill or band saw machine is illustrated, comprising a band mill frame 10 including a base or pedestal portion 10a and an upstanding portion 10b. Suitably journaled on band mill frame 10 are upper and lower wheels 12 and 14, respectively, which have trained thereabout a band saw blade indicated at 16.

The band mill illustrated is a double band mill, and thus includes a pair of band saw blades with one spaced to the rear of the other. With reference to FIG. 2, it will be seen that to the rear of saw blade 16 (or toward the top of the page from saw blade 16) is another band saw blade 22. Blade 22 is trained over wheels similar to wheels 12, 14 discussed in connection with blade 16. For reasons of clarity, and to avoid cluttering the drawing, blade 22 and associated parts mounting the blade are indicated only in dashed outline in FIG. 1. For the purposes of this description, it is sufficient to say, and reference is made to FIG. 1, that the upper part of blade 22 is trained over a wheel indicated at 18 corresponding to wheel 12, and that wheel 18 is journaled on an upstanding portion 10c similar to portion 10b. The lower part of blade 22 is trained over a wheel indicated at 20 corresponding to wheel 14, and wheel 20 is journaled on a pedestal portion (not shown) similar to pedestal portion 10a.

Wheels 12, 14, 18, and 20 mount band saw blades 16, 22 with reaches 16a and 22a of the saw blades extending substantially vertically between the wheels. With reference again to FIG. 2, a horizontal work bed mounted on band mill frame 10 is provided for each band saw blade, such work beds being indicated at 24, 25. Work beds 24, 25 have slots 26, 28 formed therein, accommodating the passage of reaches 16a, 22a of the band saw blades through the work beds.

Reaches 16a, 22a of the two band saw blades are offset laterally. Thus, a piece of lumber on being fed through the machine, in the direction indicated by the arrow in FIG. 2 (or in a direction paralleling the planes of the blades), is cut twice by the saw blades with the production of three pieces.

Customarily, saw blade 22 is adjustable in position relative to saw blade 16. In FIG 2, a wheel 29 is illustrated which is connected to conventional mechanism (not shown) operable to shift as a unit wheels 18, 20, blade 22 trained thereabout, and work bed 25, when the wheel is turned. It should be obvious that on decreasing the offset of blade 22 relative to blade 16 by proper turning of wheel 29, a thinner lumber piece is cut by the two saws, and that on increasing the offset the converse is true.

The lower wheels in the apparatus (i.e., wheels 14 and 20) are power driven to rotate the two band saw blades. Thus, considering wheel 14, connected to the wheel is a shaft 30 having a pulley 32 mounted thereon. A motor mounted on the band mill frame, and indicated at 34, has connected to its motor shaft a pulley 36. The two pulleys are interconnected, whereby one drives the other, by a belt 38. A similar drive mechanism (not shown) may be provided for rotating the rear band saw blade 22 in the band mill.

For guiding the band saw blades, and tensioning them and straining them as they cut through lumber, a band saw guide, such as the one indicated generally at 40 may be provided each blade. Guide 40 includes pressure blocks 41 snugly contacting opposite faces of a saw blade, with the pressure of engagement adjustable by adjustment of a screw 42. Reference is made to U.S. Patent 2,684,697, for a description of a band saw guide of the type that may be employed.

As so far described, the band mill or band saw machine is somewhat conventional, including as it does a pair of band saw blades mounted with reaches of the saw blades extending vertically through horizontal work beds in the band mill. As indicated above, this invention primarily concerns improvements in the means for feeding and guiding lumber into the vertical reaches of the band saw blades, with such means being adjustable whereby lumber fed into the band mill may be fed at an angle so that diagonal cuts in the lumber result. This feeding and guiding mechanism, indicated generally at 45, will now be described in greater detail.

Figure 3:
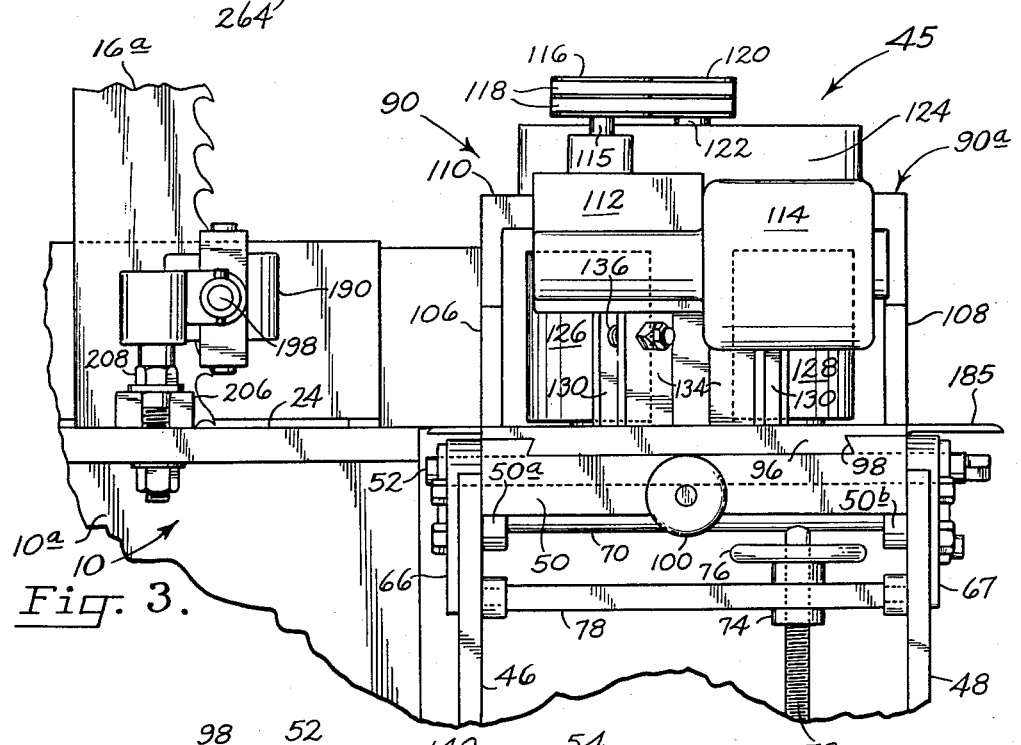
FIG. 3 is a front elevation, along the line 3—3 in FIG. 2, of portions of the band saw machine.

With reference now to FIGS. 1 and 3, on the feed side of band mill frame 10, and the work beds mounted on the frame, are a pair of complementary upstanding plates mounted in fixed position and indicated at 46 and 48 (in FIG. 1 the rear plate 46 is obscured by plate 48). Plates 46, 48 provide a mounting for an adjustable frame, indicated generally at 50, which is mounted for up and down movement, movement from side to side, and also pivotal movement in a clockwise direction from the position shown in solid outline for the frame in FIG. 1, with such pivotal movement occurring about an axis paralleling the path of lumber fed into the band mill.

The mounting of the adjustable frame on the feed side of the band mill frame, and more particularly the feed side of pedestal portion 10a, is important for several reasons, including the fact that such enables the frame to mount guide structure that engages lumber at some distance from the band saw blades (contributing toward a firmer hold of the lumber and minimizing snakey cuts), and for the reason that such allows greater freedom in the angular positioning of the adjustable frame without encumberance by the band mill frame.

Adjustable frame 50 comprises an elongated plate structure mounted between plates 46, 48 and extending out to either side of the plates in FIG. 1. Extending along each side of the plate structure are stiffening flanges, indicated at 50a, 50b (see FIG. 4). The plate structure is mounted between mounting plates 46, 48 by means of an elongated shaft 52 that extends through an accommodating transverse bore 54 provided in the plate structure with the plate structure rotatable about the shaft. Shaft 52 has ends projecting out on either side of the plate structure.

Again with reference to FIGS. 1 and 4, secured to opposite ends of shaft 52 are a pair of eccentrics 56, 58. Pins 60 provide a fixed connection between the eccentrics and the ends of shaft 52. The eccentrics are in the form of cylindrical journal members and are called "eccentric" members because the shaft 52 occupies a position offset from the center axes of the eccentrics. Eccentrics 56, 58 are snugly received within recessed bearing portions 61, 62 provided in plates 46, 48, and similar recessed bearing portions 63, 64 provided in plates 66, 67 secured to the outside of plates 46, 48.

Referring now to FIG. 3, extending between flanges 50a, 50b, and with ends journaled in the flanges, is a rod 70. Rod 70 has a threaded shaft 72 depending downwardly therefrom, and screwed into a complementary threaded part 74 having a turn wheel 76 integral therewith. Part 74 is journaled in a bar 78, such bar extending between plates 46, 48 and having its ends suitably journaled on the plates.

Figure 4:
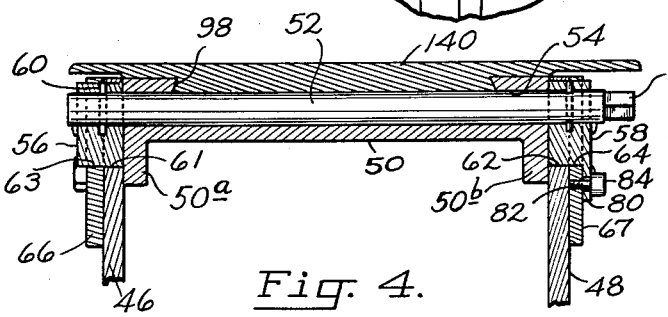
FIG. 4 is a cross-sectional view, taken generally along the line 4—4 in FIG. 2, illustrating details of the pivot mechanism provided to accommodate tilting of the means for feeding lumber into the band saw machine.

Considering again FIGS. 1 and 4, eccentric member 58 has integral therewith an apron portion 80 containing a slot 82. Extending through slot 82 is a screw 84 screwed into plate 67. The screw may be loosened to accommodate rotation of the eccentric member, within the limits permitted by slot 82. Tightening of the screw locks the eccentric member in place. Shaft 52 that is fixed to the eccentric member has a squared end portion 86, which is used for gripping the shaft when it is desired to rotate the shaft with accompanying turning of the eccentric members.

Explaining the operation of adjustable frame 50 as so far described, since the frame is journaled on shaft 52, the frame may be pivoted or swung in a clockwise direction in FIG. 1, or toward the axes of the wheels mounting a band saw, by rotating turn wheel 76 so as to lift the left end of the frame in FIG. 1. Pivotal movement will occur about the longitudinal axis of shaft 52. The eccentric members provide an additional means for adjusting the position of the adjustable frame. Thus, in FIG. 1, if the eccentric member 58 is loosened, and the same is rotated in a counterclockwise direction, adjustable frame 50 will be caused to be shifted upwardly and at the same time to the left in FIG. 1. Such movement is accompanied with similar movement of shaft 52. Rotation of the eccentric member in a clockwise direction shifts the shaft and the frame downwardly and to the right. The eccentric members, therefore, constitute vertical adjustment means, and also lateral adjustment means for adjusting the elevation of frame 50 and its position in a direction extending laterally of the saw blades.

Roll case structure, indicated generally at 90, is mounted on adjustable frame 50, for movement conjointly with the frame in the manner just described. The roll case structure comprises a roll case portion 90a on one side of the path of work fed into the band mill, and a roll case portion 90b on the other side of such path, that define the lateral limits of such path, and support lumber during the cutting thereof.

Describing first of all roll case portion 90a, this comprises a table 96 (see FIG. 2) movable longitudinally of frame 50 and guided for movement in a way 98 provided in the top of frame 50. During operation of the band mill, the table is stationary. Relative movement is provided for to accommodate adjustment in the position of the guide structure relative to the table supporting it. Adjustments in the position of the table are made by means of a hand wheel 100 connected to a threaded shaft 102 (see FIG. 1) that is screwed into a part 104 connected to the table so that on turning of the shaft the part is moved axially along the shaft.

Secured to table 96, and extending upwardly therefrom, are plates 106, 108 having a connecting plate 110 secured to the tops thereof and extending between them. Connecting plate 110 provides a mounting for a speed-reducing gear box unit 112, which is secured thereto, and a motor 114 secured to the casing of unit 112. A drive connection is provided between motor 114 and the gearing of unit 112, and the output shaft 115 of unit 112 is connected through a pulley 116, belts 118 and a pulley 120 to the input shaft 122 of a gear box unit 124. Within the unit gearing is provided that connects for driving purposes input shaft 122 to a pair of feed rollers 126, 128 (or work-contacting guide structures) in roll case portion 90a and mounted on the left side of the path of lumber fed into the band mill.

Thus, on energizing of motor 114 feed rollers 126, 128 are rotated, and rotation is in a counterclockwise direction in FIG. 2 whereby lumber contacting the rollers is advanced into the band saw blades of the band mill.

With the feeding and guide means 45 tilted as shown by the dashed outline for the means in FIG. 1, feed rollers 126, 128 are on the nongravity or uphill side of lumber fed the band mill. They do not support the weight of the lumber, but function to apply a clamping pressure thereagainst. Thus, the feed rollers are yieldably and resiliently mounted in roll case portion 90a, enabling them to move properly when variations in lumber thickness are encountered.

More specifically, the feed rollers are journaled in pivoted mountings 130, mounted on table 96 for pivotal movement about an axis 132 which coincides with the axis of input shaft 112. Interposed between the mountings and a set of brackets 134 secured to table 96, are compression springs 136. Referring to FIG. 2, the compression springs function to urge mountings 130 and the feed rollers journaled to the right and against a thin board, and accommodate shifting of the rollers to the left when a wider board is encountered.

Roll case portion 90b is somewhat similar to roll case portion 90a just discussed. Thus, a table 140 is provided, and this is adjustably positionable along the length of frame 50 in a manner similar to table 96. A hand wheel 142 provides a means for making adjustments in the position of table 140. Plates 144, 146, and a connecting plate 148 are secured to table 140, and provide a mounting for a gear box unit 150, and through the casing of the gear box unit a mounting for a motor 152. Drive is from the motor and through the gears of the gear box unit to a pulley 154, belts 156, a pulley 158, and to an input shaft 160 of a gear box 162 containing gears whereby a set of feed rollers 164, 166 are driven upon energizing of motor 152.

With reference now to FIG. 1, and considering the positions shown for feeding and guide structure 45 in the solid and dashed outlines, it will be seen that on tilting of the structure feed roller 166 (thus also roller 164) is on the downhill or gravity side of work fed into the band mill. Thus, these feed rollers partially support the weight of the work. Preferably, therefore, they should rotate about stationary axes (as compared to the yieldable axes discussed in connection with feed rollers 126, 128) as in this manner the support plane they define remains fixed and more even cutting results. No yieldable support, it will be noted, has been provided for rollers 164, 166.

Secured to plate 144 is a part 170 including an elongated, upright guide portion 172. Guide portion 172 parallels the support plane of feed rollers 164, 166. Mounted on guide portion 172 is an elongated fence 174, that extends from plate 144 rearwardly past the band saw blades 16, 22, and on the inside of these blades. Fence 174 has a surface 176 that guides lumber, and this surface is in the same plane as the support plane defined by feed rollers 164, 166.

Guide portion 172 provides a mounting for the fence that accommodates shifting of the fence in a direction paralleling its support plane. The fence is secured in various positions of adjustment by a clamp screw 178 rotated by a turn wheel 180. It is important that a board have support during the actual cutting thereof, and since the fence extends beyond the saw blades and on the inside thereof (and on the gravity side with the structure 45 tilted), this fence provides the necessary support.

When feeding and guide structure 45 is shifted in a clockwise direction in FIG. 1 (or toward the axes of the wheels supporting the band saw blades) the fence is shifted away from the band saw blades. This eliminates any problem of clearance with respect to the blades. Adjustment of the fence in an up and down direction is desirable, however, to accommodate differences in board widths. Also, if structure 45 is shifted to an extreme position in a clockwise direction, some vertical upward movement may be desirable in order that the bottom of the fence clear work beds 24, 25.

The fence and rollers 124, 126 and 164, 166 provide lateral support for a board. Table 140 has a portion 185 extending beneath the rollers, and this portion constitutes a feed bed and provides support for the base of a board.

Pressure rollers are provided for urging a board firmly against the fence during the cutting thereof. These are indicated (and reference is made to FIG. 2) at 190, 192, and 194. The pressure rollers are substantially the same in construction, and only one is described in detail.

Thus, each comprises (and with reference to roller 190) a mounting including a compression spring 196 operable yieldably to urge the roller toward fence 174. Spring 196 encircles a plunger 198 mounted in a sleeve portion 200 that is secured to a bracket 202 by a screw 204. Loosening of the screw accommodates swinging of sleeve portion 200 about a horizontal axis (and thus changing of the angle of the pressure roller relative to feed bed 24 therebelow). Bracket 202 is joined to a U-shaped part 206, and the latter is fastened to work bed 24 by a nut and bolt assembly 208. On loosening of the assembly, part 206 and bracket 202 may be swung about a vertical axis, thus to change the position of roller 190.

Explaining now the operation of feeding and guide structure 45 (and referring to FIGS. 1 and 6), portion 185 (or the feed bed) and feed rollers 126, 128 and 164, 166 (constituting opposed work-contacting guide structures) define a channel-shaped guide for work fed the band mill. With the structure in the position shown in solid outline in FIG. 1 (or upright), the top of feed bed 185 is horizontal and in the same plane as the plane of the top of work beds 24, 25 in the band mill.

If it is now desired to cut a board with diagonal cuts, as for instance in the manufacture of molding strips, then adjustable frame 50 of means 45 may be tilted about the axis of shaft 52 and in a clockwise direction, or in a direction causing the guide structures to slope over toward the axes of the wheels supporting the band saw blades. When such tilting is performed, it will be noted by referring to the outline indicated for means 45 at 45A in FIG. 6 that a portion of feed bed 185 between the sets of rollers drops below the level formerly occupied by the feed bed (which is the level of work beds 24, 25). Thus, if no correction were made, a board, on traveling along the feed bed, would strike a corner of bed 24 upon entering the band mill. This would disrupt smooth travel of the board, and detracts from the support for the base of the board provided by work beds 24, 25. To take care of this, the eccentric members may be shifted (after first loosening screw 84) to place the parts in the position indicated generally by the outline label 45B in FIG. 6. This shifting of the eccentrics (which is in a counterclockwise direction in FIG. 6) operates to lift means 45 and at the same time shift means 45 laterally to the left. As a result feed bed 185 between the rollers is entirely at or above the level of the work beds in the band mill. Additionally, the line formed by the intersection of the support plane of the right set of rollers and the work bed occupies substantially the same position it formerly had.

Figure 5:
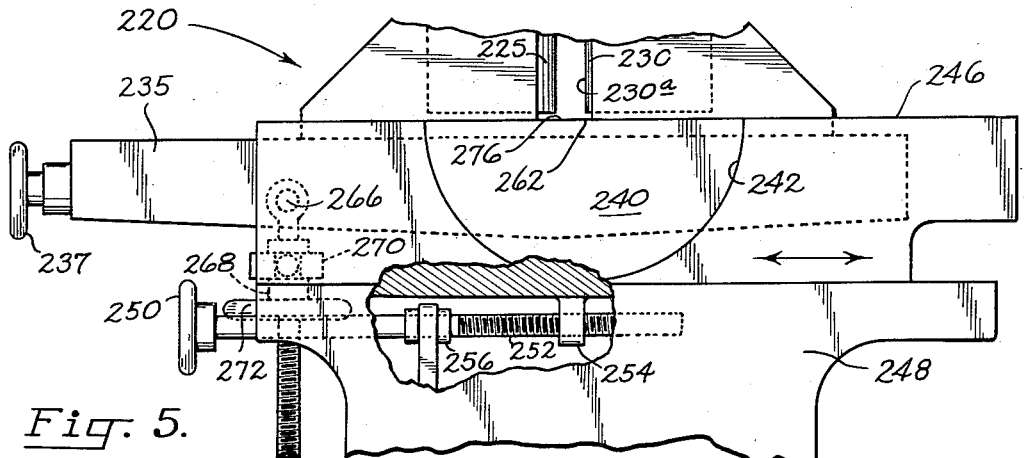
FIG. 5 is a side elevation, corresponding to portions of FIG. 1 but on a larger scale, of a band saw machine constructed according to a modification of the invention.

In FIGS. 5 and 7 another embodiment of the invention is illustrated. In this embodiment of the invention, a feeding and guiding means 220 is shown, including a set of feed rollers 225, and a set of feed rollers 230. These may be mounted on tables in substantially the same manner as previously described in connection with the first embodiment discussed. An adjustable frame 235 is provided, corresponding to adjustable frame 50 previously discussed. Set of feed rollers 225 is adjustable to and fro on frame 235 using mechanism such as that discussed in connection with rollers 124, 126 actuated by a hand wheel 237.

In this embodiment of the invention, the adjustable frame has secured thereto, and supporting opposite sides, journal parts such as journal parts 240 of semicircular outline. These are received within recessed bearing portions, such as recessed bearing portion 242, provided in a subframe 246. Subframe 246 is mounted on a main frame 248, for movement to and fro thereon in a horizontal direction, as indicated by the double-ended arrow in FIG. 5.

A hand wheel 250 is connected to a threaded shaft 252, such shaft being screwed into an internally threaded portion 254 that is integral with subframe 246. Shaft 252 is anchored from axial shifting by a part 256 journaled in portions of main frame 248. On turning of the hand wheel, the subframe is caused to move on the main frame.

Interposed between adjustable frame 235 and subframe 246 is hand wheel actuated mechanism for tilting adjustable frame 235, with the same pivoting about a pivot axis indicated at 262, which is the center of the semicircular journal parts 240. This mechanism comprises a threaded shaft 264 pivotally connected at 266 to the adjustable frame, and screwed into an internally threaded part 268, with the latter being journaled on a portion 270 pivotally mounted on the subframe. A hand wheel 272 integral with part 268 may be turned, to rotate part 268 and cause axial shifting of shaft 264, such being accompanied with lifting or dropping of the end of adjustable frame 235 depending upon the direction that the hand wheel is turned.

In this embodiment of the invention, the feed bed location is indicated at 276. Set of feed rollers 230 has contacting surface portions, indicated at 230a, that define a work-supporting plane, with such plane intersecting the plane of feed bed 276 along a line coinciding with pivot axis 262.

Because pivot axis 262 coincides with this line where the planes intersect, on pivotal movement of means 220 and the adjustable frame 235, tilting of feed bed 276 occurs without the feed bed between the sets of feed rollers dropping below the level it formerly had. Reference is made to FIG. 7, where there is shown in solid outline and indicated at 220 the position of the parts with bed 276 in a horizontal position. In dashed outline and indicated at 220A there is illustrated the position of the parts after pivotal movement has occurred. Since no part of bed 276 between the sets of rollers drops, clearance difficulties are eliminated.

In summary, there has been provided novel means for feeding and guiding lumber into a band mill. The mechanism or means is adjustable easily to produce diagonal cuts in lumber fed the band mill. Tilting movement is inwardly toward the axes of the wheels supporting the band saw blades. The downhill or gravity side of lumber with the feeding and guide means tilted is always supported by means that defines a nonyielding support plane.

I claim:

1. In a band saw machine including a work bed, a band saw blade, and vertically spaced upper and lower wheels training the band saw blade with a reach of the saw blade extending between the wheels and past said work bed, means for guiding work traveling into said reach of the saw blade comprising an adjustable frame; first and second work-contacting guide structures mounted on said adjustable frame in position to engage opposite sides, respectively, of work fed into the band saw blade; at least one of said guide structures defining substantially a nonyieldable vertical support plane; a feed bed extending between said first and second work-contacting guide structures for supporting the base of work fed into the band saw blade; and means mounting said adjustable frame adjacent said work bed including pivot means accommodating swinging of the adjustable frame and guide structures whereby the support plane defined by said one guide structure, progressing in an upward direction, inclines inwardly toward the axis of the said upper wheel; said means mounting said adjustable frame further including vertical adjustment means accommodating adjustment in the elevation of said adjustable frame relative to said work bed whereby said feed bed between said work-contacting guide structures may be placed at least at substantially the elevation of said work bed with said support plane in an inclined as well as a vertical position.

2. In a band saw machine including a band saw blade and vertically spaced upper and lower wheels training the band saw blade with a reach of the saw blade extending therebetween, means for guiding work traveling into said reach of the saw blade comprising an adjustable frame; a first nonyieldable and work-contacting guide structure mounted on said adjustable frame in position to engage a side of work fed to the saw blade with such side being spaced toward the axes of said wheels from the saw blade; a second work-contacting guide structure mounted on said adjustable frame for engaging a side of work fed to the saw blade opposite the first-mentioned side; said second guide structure being yieldable away from said first guide structure and including bias means for urging it toward said first guide structure; said first guide structure defining approximately a vertical support plane; and means mounting said adjustable frame accommodating shifting of its position and the position of said guide structures whereby the vertical support plane defined by said first guide structure, progressing in an upward direction, inclines toward the axis of said upper wheel.

3. In a band mill including a band saw blade, a band mill frame, a work bed mounted on said band mill frame, and vertically spaced upper and lower wheels mounted on said band mill frame training the band saw blade with a reach of the saw blade extending between the wheels and past said work bed, means for guiding work traveling into said reach of the saw blade comprising an adjustable frame mounted on the feed side of said work bed; first and second work-contacting guide structures mounted on said adjustable frame in position to engage opposite sides, respectively, of work fed into said reach of the band saw blade; one of said guide structures defining a substantially vertical nonyieldable support plane spaced toward the axes of said wheels from said reach of the saw blade; a fence spaced toward the axes of said wheels from said reach of the saw blade mounted on said adjustable frame and extending over said work bed, said fence defining a support plane substantially coinciding with the support plane of said one guide structure; and means mounting said adjustable frame including pivot means accommodating swinging of the position of said adjustable frame with tilting of said fence and said first guide structure whereby their support planes, progressing upwardly therealong, incline inwardly toward the axes of said wheels, and vertical adjustment means enabling adjustment in the elevation of said adjustable frame and with adjustment in the elevation of said adjustable frame adjustment in the elevation of said fence over said work bed.

4. The band mill of claim 3, wherein said fence is mounted on said adjustable frame by means accommodating shifting of the position of said fence in a direction paralleling its support plane, whereby on swinging of said adjustable frame and a change of the incline of said fence, the fence may be shifted on said adjustable frame without changing the incline of its support plane.

5. In a band saw machine including a work bed defining a work-supporting plane and a band saw blade mounted with a portion thereof extending in an upright reach past said work bed, guide means on the feed side of said upright reach of the saw blade defining a channel-shaped guide for work fed to the saw blade and having portions adapted to contact the base and opposite sides of such work; and means mounting said guide means; said means mounting said guide means including pivot means accommodating swinging of the guide means about an axis paralleling the path of work traveling into the saw blade, and means mounting said pivot means constructed to enable adjustment in the elevation of said pivot means and in addition adjustment in the position of the pivot means in a direction extending laterally of said reach of the saw blade to position the base-contacting portion of said guide means at least at the elevation of said work-supporting plane of said work bed.

6. The band saw machine of claim 5, wherein the means mounting said pivot means comprises an eccentric member mounted for rotation about an axis offset from the pivot axis of said pivot means.

7. In a band saw machine including a band saw blade, and vertically spaced upper and lower wheels training the band saw blade with a reach of the saw blade extending therebetween, means for guiding work into said reach of the saw blade comprising opposed guide structures positioned to engage opposite sides, respectively, of work fed into said reach of the saw blade; one of said guide structures defining a substantially vertical support plane spaced toward the axes of said wheels from said reach of the saw blade; and means mounting at least said one guide structure whereby the same may be adjusted to a tipped position and provide support for the gravity side of work fed to the saw blade with the upper extremity of the guide structure inclined inwardly toward the axes of said wheels; said one guide structure being nonyieldable and thus in its tipped position offering a fixed support plane for the gravity side of the work; the other guide structure having bias means operatively connected thereto for urging it yieldingly toward the support plane of said one guide structure in all of its positions.

8. In a band saw machine including a work bed, defining a work-supporting plane, a band saw blade, and vertically spaced upper and lower wheels training the band saw blade with a reach of the saw blade extending between the wheels and substantially vertically past said work bed, means on the feed side of said reach of the saw blade for guiding work traveling into the saw blade comprising a feed bed defining a support plane substantially coinciding with the support plane of said work bed; opposed work-contacting guide structures mounted above said feed bed in position to engage opposite sides, respectively, of work fed said saw blade; one of said guide structures defining a substantially nonyieldable vertical support plane that is spaced toward the axes of said wheels from said reach of the saw; and pivot means pivotally mounting said feed bed and at least said one guide structure enabling them both to be tipped with the upper extremity of said one guide structure inclined inwardly toward the axes of said wheels; said pivot means having a pivot axis coinciding substantially with the line produced by the intersection of the support plane of said one guide structure and the support plane of said feed bed.

9. The band saw machine of claim 8, wherein the other guide structure comprises a rotatable feed roller means having bias means attached thereto yieldably and resiliently accommodating movement of the rotation axis of the roller means away from said one guide structure; and wherein said one guide structure comprises another feed roller means having, in operative position, a fixed rotation axis.

10. In a band mill including a band saw blade, a band mill frame, a work bed defining a work-supporting plane mounted on said band mill frame, and vertically spaced upper and lower wheels mounted on the band mill frame training the band saw blade with a reach of the saw blade extending between the wheels and past said work bed; an adjustable frame mounted on the feed side of said band mill frame; a feed bed mounted on said adjustable frame defining a support plane substantially coinciding with the work-supporting plane of said work bed; opposed work-contacting feed roll means mounted in said adjustable frame above said feed bed defining the lateral limits of the path for work fed to said reach of the saw blade; pivot means mounting said adjustable frame accommodating tipping of said feed bed and the feed roll means mounted thereabove as a unit about an axis paralleling the path of work to said reach of the saw blade with the feed roll means inclining inwardly progressing in an upward direction toward the axes of said wheels; and means for adjusting both vertically and horizontally the pivot axis of said pivot means to position that portion of the support plane defined by said feed bed between the lateral limits of the path for work at an elevation at least equal to that of said work bed.

11. The band mill of claim 10, and further comprising a fence mounted on said adjustable frame for movement conjointly with said feed bed, said fence extending rearwardly from said feed roll means past said reach of the saw blade on the inside thereof, the mounting for said fence on said adjustable frame including means accommodating shifting of the fence up and down.

12. In a band mill including a band saw blade, a band mill frame, a work bed defining a work-supporting plane mounted on said band mill frame, and vertically spaced upper and lower wheels mounted on said band mill frame and training the band saw blade with a reach of the saw blade extending between the wheels and past said work bed; an adjustable frame mounted on the feed side of said band mill frame; a feed bed mounted on said adjustable frame defining a support plane substantially coinciding with the supporting plane of said work bed; opposed work-contacting feed roll means disposed above said feed bed and defining the lateral limits of a path for work being fed into said reach of the saw blade; one of said feed roll means being spaced inwardly toward the axes of said wheels from said reach of the saw blade and the other of said feed roll means being spaced outwardly of said reach of the saw blade; a nonyieldable means mounting said one feed roll means on said adjustable frame; means mounting the other feed roll means on said adjustable frame including bias means yieldably accommodating movement of said other feed roll means toward and away from said one feed roll means; means for pivoting said adjustable frame together with the feed bed and feed roll means mounted thereon as a unit about an axis paralleling the path of work fed the saw blade with the feed roll means, inclining inwardly, progressing in an upward direction, toward the axes of said wheels; said one feed roll means in an inclined position providing support for work on the gravity side of the work; and means for adjusting both vertically and horizontally the position of the pivot axis of said pivot means to position that portion of the support plane defined by said feed bed between the lateral limits of the path for work at an elevation at least equal to that of said work bed.

References Cited by the Examiner

UNITED STATES PATENTS

| | | | |
|---|---|---|---|
| 166,355 | 8/75 | First. | |
| 261,579 | 7/82 | Brophy | 143—22 |
| 267,280 | 11/82 | Thomas | 143—5 |
| 692,428 | 2/02 | Clement | 143—5 |
| 1,959,475 | 5/34 | Hutchings. | |
| 2,075,282 | 3/37 | Hedgpeth. | |
| 2,201,413 | 5/40 | Turner | 143—22 X |
| 2,661,033 | 12/53 | Daniel | 143—167 X |
| 2,664,923 | 1/54 | Ferrari | 143—8 X |

FOREIGN PATENTS

| | | |
|---|---|---|
| 377,615 | 7/07 | France. |
| 531 | 1863 | Great Britain. |

WILLIAM W. DYER, JR., *Primary Examiner.*

WILLIAM FELDMAN, DONALD R. SCHRAN,
*Examiners.*